J. REBOURS.
AUTOMOBILE BODY.
APPLICATION FILED NOV. 27, 1916.
1,326,877.
Patented Dec. 30, 1919.
2 SHEETS—SHEET 1.
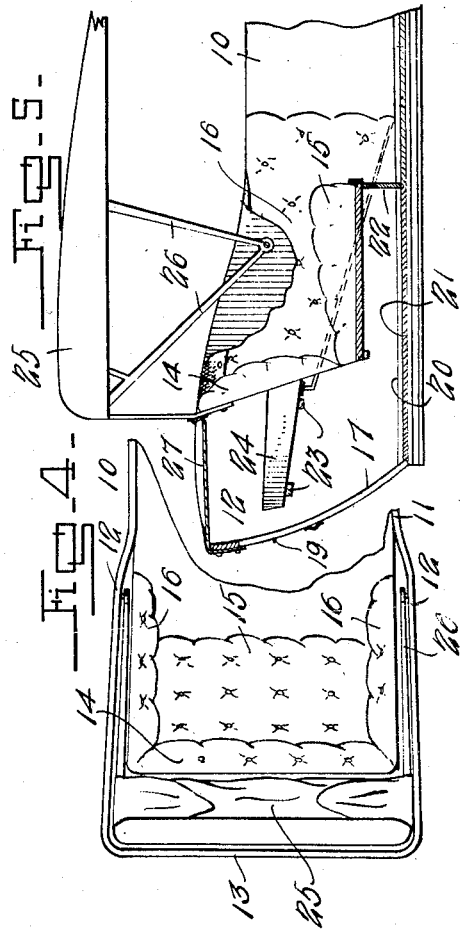
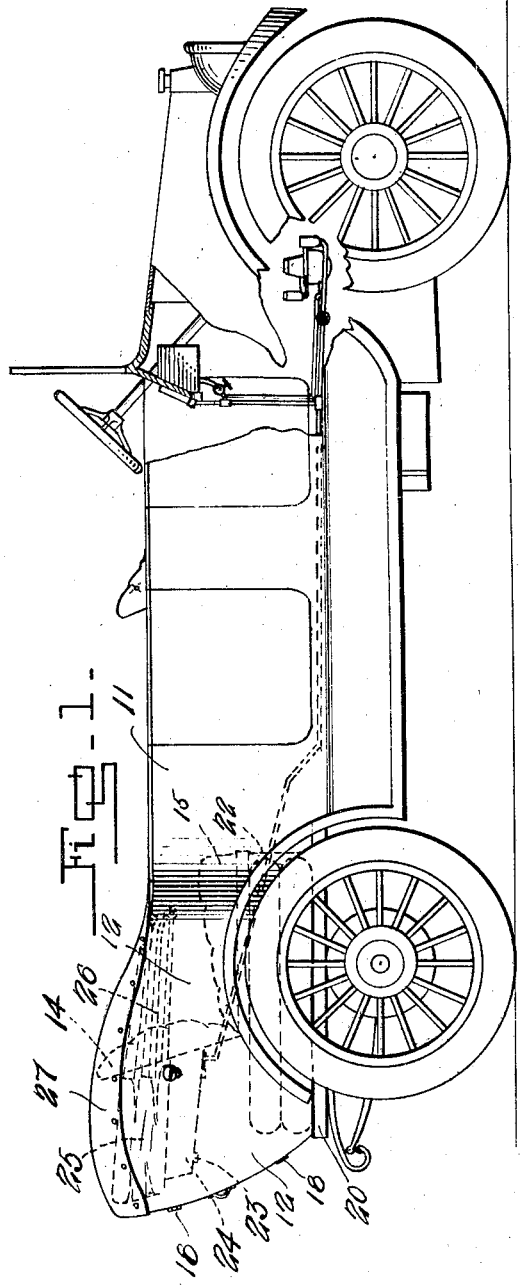
Inventor
Jules Rebours
By Lancaster and Allwine
His Attorney J. REBOURS.
AUTOMOBILE BODY.
APPLICATION FILED NOV. 27, 1916.
1,326,877.
Patented Dec. 30, 1919.
2 SHEETS—SHEET 2.
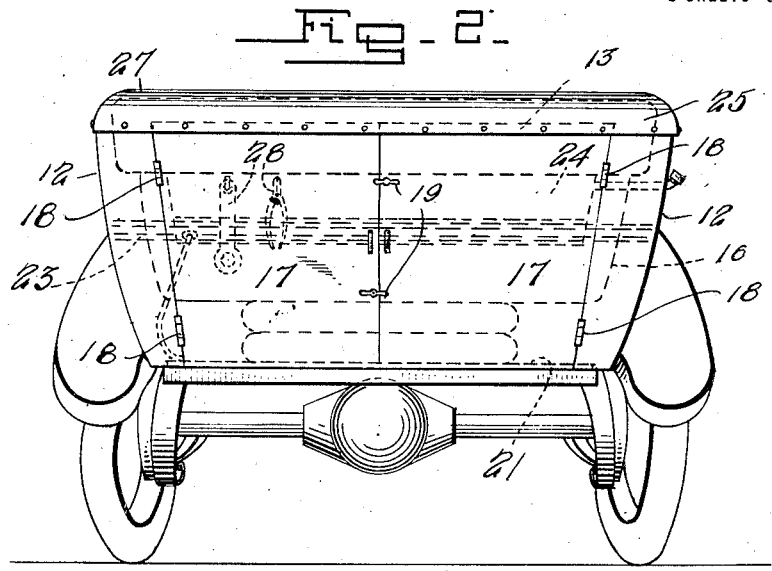
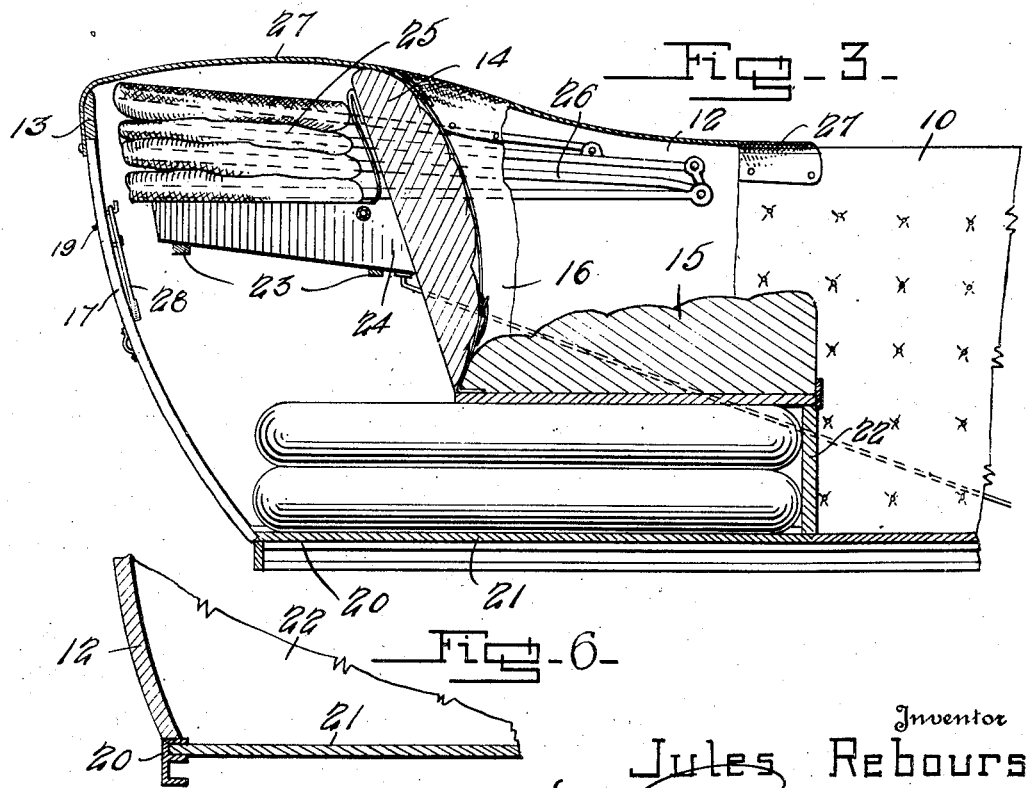
Inventor
Jules Rebours
By Lancaster and Allwine
His Attorneys

UNITED STATES PATENT OFFICE.

JULES REBOURS, OF GRAND RAPIDS, MICHIGAN.

AUTOMOBILE-BODY.

1,326,877.   Specification of Letters Patent.   Patented Dec. 30, 1919.

Application filed November 27, 1916. Serial No. 133,591.

*To all whom it may concern:*

Be it known that I, JULES REBOURS, a citizen of France, and a resident of Grand Rapids, in the county of Kent and State of Michigan, have invented a certain new and useful Improvement in Automobile-Bodies, of which the following is a specification.

The present invention relates to motor vehicles, and has particular reference to the construction of the body of the same.

The invention has for an object to provide a motor vehicle body having the rear end thereof so formed as to provide, about the seat, a substantially U-shaped compartment adapted to receive the top of the motor vehicle when the top is folded.

Another object of the present invention is to provide a body construction wherein a compartment is formed in the rear end of the body about and beneath the seat, adapted to carry tires, the top of the motor vehicle when folded, the gasolene tank, tools, and other articles which it is desired to carry. This feature of the invention contemplating the provision of means whereby access may be readily had to this rear end compartment, and wherein the articles contained therein are protected from dust, weather, and from accidental displacement incident to the jarring of the vehicle.

The invention also aims at the provision of a body structure provided with the above-described rear end compartment, and which has a removable floor or bottom section adapted to be removed when the compartment is open to admit easy access to the differential housing, and other parts of the motor vehicle which are arranged beneath the rear end of the body.

The above, and various other objects and advantages of this invention will be more clearly brought out in the following detailed description of the present preferred embodiment, the same being illustrated in the accompanying drawings wherein:

Figure 1 is a side elevation of a motor vehicle constructed according to the present invention, parts of the same being broken away.

Fig. 2 is a rear end elevation of the same.

Fig. 3 is an enlarged, sectional, view taken longitudinally and centrally through the rear end of the automobile body.

Fig. 4 is a top plan view of the same, on a reduced scale.

Fig. 5 is a longitudinal section taken through the rear end of the automobile body, showing the top thereof raised and the flexible cover secured over the rear end compartment for closing the same.

Fig. 6 is a detail transverse section through one side of the automobile body, showing the mounting of the removable floor section which comprises the bottom of the rear end compartment.

Referring to these drawings wherein like parts are designated by similar numerals of reference throughout the several views, the body of the motor vehicle is provided with the opposed sides 10 and 11 which, at their forward ends, are of substantially the usual form. The rear ends of the sides 10 and 11, however, are offset outwardly from the plane of the sides, as at 12. The side portions 12 flare rearwardly to a slight extent, and are joined at their upper edges by a connecting back strip 13 which extends across the rear end of the body and is spaced to an appreciable extent from the back 14 of the seat 15. The seat 15 is provided with the usual sides 16, the latter being spaced inwardly from the side portions 12 of the body as shown to advantage in Fig. 4. The rear strip 13 is relatively narrow, as shown in Fig. 3, and the body is open beneath the strip 13, and is adapted to be closed by one or more doors 17.

The doors or closures 17 are shown in the present instance as being hinged at their outer edges to the inwardly curved side portions 12 of the body, as indicated at 18. Suitable fastening devices 19 are mounted on the doors 17 and are adapted to interlock to hold the doors in closed position. The side portions 12 of the body are provided at their lower edges with inwardly facing side ways or ledges 20 between which is slidably mounted a bottom board or section 21 adapted to be slid outwardly from the body when the doors 17 are opened. From Fig. 3, it will be noted that the rear edge of the board 21 is engaged by the lower ends of the doors 17, and the board 21 is therefore positively held from accidentally working out through the rear end of the body. The board 21 or bottom section, is of considerable length and is adapted to cover the motor vehicle mechanism arranged beneath the rear end of the body. The removal of this board 21 permits ready access to the motor vehicle parts arranged therebeneath.

The compartment in the rear end of the body extends beneath the seat 15 and is closed at its forward end by the riser or front board 22 of the seat. The space between the bottom 21 and the seat 15 is of sufficient height to receive relatively large articles therein, such as tires, as shown in Fig. 2.

Extending across the rear side of the back 14 of the seat, and supported upon the transversely extending brace bars 23, is a relatively flat fuel tank 24. The tank 24 is secured across the back 14 at a point intermediate the top and bottom edges of the back and the top thereof is relatively flat to provide a ledge or shelf to receive thereon the folded top 25 of the automobile when the same is not in use. When the top 25 is folded and swung back upon the tank or support 24, the ribs 26 of the top lie in the lateral compartments or extensions of the rear compartment formed between the sides 16 of the seat and the side portions 12 of the body. The side portions 12 of the body are not only offset outwardly to provide the lateral extensions of the rear compartment, but they are also enlarged vertically to impart to the rear end of the body sufficient depth for forming the compartments and inclosing the top 25, as well as to extend at least substantially flush with the top of the back 14. A flexible cover 27 is detachably secured, in any suitable manner by detachable fasteners, over the upper edge of the side portions 12 and the rear transverse strip 13 of the automobile body, and the cover 27 extends inwardly over the top of the compartment to inclose the same, and has its inner edge lapping over and detachably secured to the back 14 and the sides 16 of the seat. This cover 27 is adapted to engage over the folded top 25 and to thus completely house and protect the same.

In the present instance, the doors 17 are disclosed as having tools 28 suspended, or otherwise suitably secured against the inner sides thereof, the showing being conventional to illustrate that the inner sides of the doors may be employed for carrying various small articles.

In use, it is only necessary to open the rear doors 17 and to place or remove articles within and from the body. Tires and other large articles may be stowed away on the bottom 21 beneath the seat 15, the compartment extending rearwardly of the seat and thus affording ample depth to the compartments. The fuel tank 24 is of such construction, and is so mounted upon the transverse supporting rods 23 that the fuel tank forms a shelf or support for the top 25 when folded, or for any other article or device which is to be stowed away in the compartment. It is also noted that ample room is provided beneath the fuel tank 24 for the reception of lap robes, and other like articles which may be readily folded and placed beneath the fuel tank. The doors 17 may be provided with any suitable supporting means upon their inner sides for carrying tools, and other small articles, and for holding them in separated positions for easy access upon the swinging of the doors 17 into open position.

When the top 25 is raised the cover 27 is adapted to be secured to the back curtain of the top, as shown in Fig. 5, to close the compartment at the rear of the body and exclude dust and the like therefrom.

It is of course understood that various changes and modifications may be made in the specifically-outlined construction above set forth without departing from the spirit of this invention, and being restricted only by the scope of the following claims.

I claim:

1. In a motor vehicle, the combination of a body, a seat arranged in the rear end of the body with its back spaced from the rear wall of the body to provide a compartment therein, doors carried by the rear wall of the body to permit access to said compartments, a removable cover for said compartments, and means for attaching one edge portion of said cover to said doors, to prevent accidental swinging movement of the doors.

2. In a motor vehicle, the combination, of a body, a seat arranged in the body and being spaced from the rear wall thereof to provide a compartment, a top hingedly mounted on the body and adapted to be folded backwardly into the compartment between the rear wall and the seat, doors in the rear wall to permit access to the compartment, and a detachable flexible cover adapted to form a top for said compartment and have its rear end portion overlapping and attached to the upper edge portions of said doors.

3. In a motor vehicle, the combination, of a body, a seat arranged in the body and spaced forwardly from the rear wall thereof to provide a compartment in the rear end of the body, a top carried by the body and adapted to be folded back into the said compartment, a supporting shelf arranged in the upper portion of said compartment for supporting said folded top, and to provide a space therebetween for the reception of articles, a hinged door in the rear wall of said body adapted to permit access to the interior of said compartment, a flexible cover for said compartment, and means for detachably connecting said cover to the upper edge of said door to prevent accidental swinging movement of the door.

4. In a motor vehicle, the combination, of a body having a rear end compartment, a door hinged upon the body adapted to close said compartment, a removable floor section in said compartment and adapted to be removed to permit access beneath the body, said door when closed being adapted to engage said removable floor section and retain the same in position, a removable flexible cover for said compartment, and means for detachably connecting the rear edge of said cover to said door to prevent accidental swinging movement of the door.

JULES REBOURS.